(12) United States Patent
Miyagawa et al.

(10) Patent No.: US 10,371,560 B2
(45) Date of Patent: Aug. 6, 2019

(54) LIQUID SURFACE SENSING DEVICE

(71) Applicant: DENSO CORPORATION, Kariya, Aichi-pref. (JP)

(72) Inventors: Isao Miyagawa, Kariya (JP); Hiroshi Hashimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 127 days.

(21) Appl. No.: 15/109,751

(22) PCT Filed: Dec. 17, 2014

(86) PCT No.: PCT/JP2014/006294
§ 371 (c)(1),
(2) Date: Jul. 5, 2016

(87) PCT Pub. No.: WO2015/111115
PCT Pub. Date: Jul. 30, 2015

(65) Prior Publication Data
US 2016/0327424 A1    Nov. 10, 2016

(30) Foreign Application Priority Data

Jan. 22, 2014  (JP) .................................. 2014-009872

(51) Int. Cl.
*G01F 23/36*       (2006.01)
(52) U.S. Cl.
CPC .................................. *G01F 23/363* (2013.01)
(58) Field of Classification Search
CPC .................................................... G01F 23/363

USPC ......................................................... 73/317
See application file for complete search history.

(56) References Cited

U.S. PATENT DOCUMENTS

| | | | | | |
|---|---|---|---|---|---|
| 2,237,562 | A | * | 4/1941 | Knox, Jr. ............... | H02G 3/088 174/17 R |
| 3,974,847 | A | * | 8/1976 | Hodges ................... | C02F 1/686 137/101.11 |
| 5,834,694 | A | * | 11/1998 | Bakker ............... | B60R 16/0207 174/135 |
| 8,561,417 | B1 | * | 10/2013 | Cantolino .............. | H01H 29/04 62/150 |
| 2011/0240363 | A1 | * | 10/2011 | Dinh ...................... | H02G 3/088 174/551 |

(Continued)

FOREIGN PATENT DOCUMENTS

| | | |
|---|---|---|
| JP | 2012251906 A | 12/2012 |
| JP | 2013178141 A | 9/2013 |

*Primary Examiner* — John Fitzgerald
*Assistant Examiner* — Jean F Morello
(74) *Attorney, Agent, or Firm* — Harness, Dickey & Pierce, P.L.C.

(57) ABSTRACT

A liquid surface sensing device is installed in a fuel tank having an opening in a ceiling part. The opening is closed by a flange with a gasket constituted by an elastomer providing a seal between the flange and a peripheral edge of the opening. The liquid surface sensing device being assembled to the flange includes a sensing unit disposed vertically below the flange and sensing a liquid surface of a liquid, a lead wire connecting the sensing unit to an external device via the flange, and a guide bending the lead wire extending diagonally downward from the flange to form a valley portion to direct the lead wire diagonally upward.

18 Claims, 4 Drawing Sheets

(56) References Cited

U.S. PATENT DOCUMENTS

| | | | |
|---|---|---|---|
| 2012/0111108 A1* | 5/2012 | Hashimoto | G01F 23/363 73/317 |
| 2012/0186340 A1* | 7/2012 | Shimizu | G01F 23/36 73/317 |
| 2012/0304761 A1 | 12/2012 | Miyagawa et al. | |
| 2013/0078853 A1* | 3/2013 | Dinh | H02G 3/088 439/535 |
| 2014/0024246 A1* | 1/2014 | Krohne | H02G 3/32 439/449 |
| 2014/0238510 A1* | 8/2014 | Henry | B60K 15/03 137/544 |

* cited by examiner ately downward, the guide, which bends the lead wire and forms the valley portion to direct the lead wire diagonally upward, causes the liquid composition to stay in the valley portion and to hardly travel from the valley portion toward the sensing unit. It prevents the liquid composition from adhering or bonding to metals used in the sensing unit, which may cause deterioration of the sensing unit or adversely affect the sensing results.

LIQUID SURFACE SENSING DEVICE

CROSS REFERENCE TO RELATED APPLICATIONS

This application is a U.S. National Phase Application under 35 U.S.C. 371 of International Application No. PCT/JP2014/006294 filed on Dec. 17, 2014 and published in Japanese as WO 2015/111115 A1 on Jul. 30, 2015. This application is based on and claims the benefit of priority from Japanese Patent Application No. 2014-009872 filed on Jan. 22, 2014. The entire disclosures of all of the above applications are incorporated herein by reference.

TECHNICAL FIELD

The present disclosure relates to a liquid surface sensing device that senses the liquid surface of a liquid.

BACKGROUND ART

Liquid surface sensing devices that sense the liquid surface of a liquid have hitherto been known. In a device described in Patent Literature 1, an opening is formed in the ceiling of a fuel tank, with a lid closing the opening. A lead wire connects a liquid surface sensor having a sensing unit such as a hole IC or the like with an external device.

To improve the sealing properties between the fuel tank and the lid, it has been common in recent years to provide a rubber gasket between the fuel tank and the lid. However, such a gasket may suffer bleeding which is an exuding phenomenon of a liquid composition contained in the gasket, and such liquid composition may travel down the lead wire and adhere or bond to metals used in the sensing unit of the liquid surface sensing device, which may deteriorate the sensing unit or adversely affect the sensing results.

PRIOR ART LITERATURES

Patent Literature

Patent Literature 1: JP2013-178141A

SUMMARY OF INVENTION

The present disclosure was made in consideration of the circumstance described above, an object thereof is to provide a liquid surface sensing device that reduces the possibility of a composition contained in a gasket adhering or bonding to metals of a sensing unit and thereby causing deterioration of the sensing unit or adversely affecting the sensing results.

According to an aspect of the present disclosure, the liquid surface sensing device installed in a container having an opening in a ceiling part. The opening is closed by a flange with a gasket constituted by an elastomer providing a seal between the flange and a peripheral edge of the opening. The liquid surface sensing device being assembled to the flange includes a sensing unit disposed vertically below the flange and sensing a liquid surface of a liquid inside the container, a lead wire connecting the sensing unit to an external device via the flange, and a guide bending the lead wire extending diagonally downward from the flange to form a valley portion to direct the lead wire diagonally upward.

According to the first embodiment, when a liquid composition of the elastomer that is the gasket sealing between the container and the flange exudes and travels down the lead wire extending from the flange diagonally downward, the guide, which bends the lead wire and forms the valley portion to direct the lead wire diagonally upward, causes the liquid composition to stay in the valley portion and to hardly travel from the valley portion toward the sensing unit. It prevents the liquid composition from adhering or bonding to metals used in the sensing unit, which may cause deterioration of the sensing unit or adversely affect the sensing results.

DESCRIPTION OF EMBODIMENTS

Figure 1:
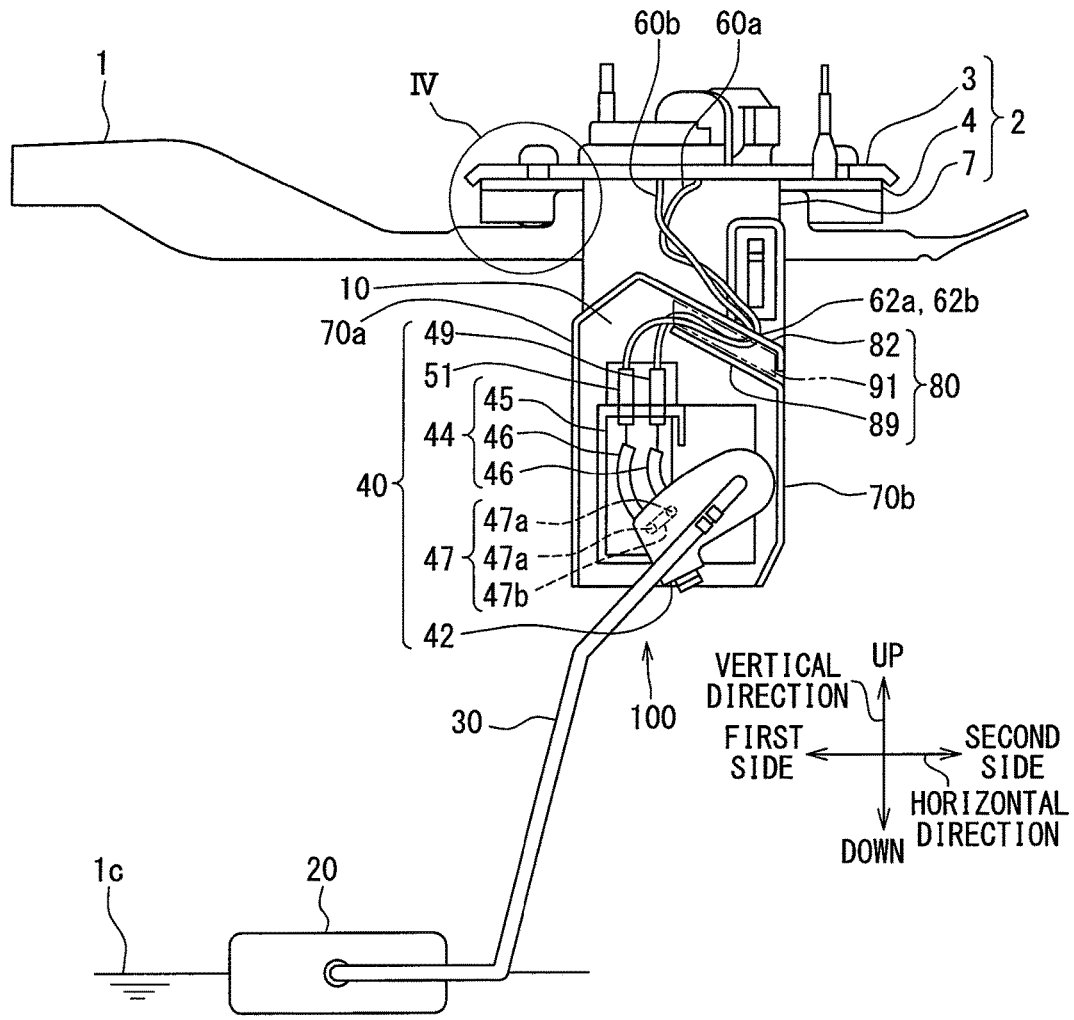
FIG. 1 is a front view schematically illustrating the arrangement of a fuel tank, an assembling unit, and a liquid surface sensing device in a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
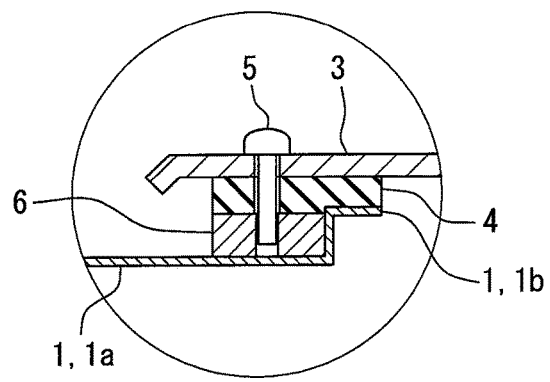
FIG. 2 is an enlarged view illustrating part IV of FIG. 1.

As illustrated in FIGS. 1 and 2, a liquid surface sensing device 100 of the first embodiment is installed inside a fuel tank 1, which is a container storing fuel, which is a liquid, and assembled to an assembling unit 2. Although not illustrated, the fuel tank 1 is mounted on a vehicle.

In the present embodiment, as illustrated in FIG. 1, the vertical direction coincides with the direction of gravity applied to the vehicle and the fuel tank 1. The horizontal direction coincides with the direction along a liquid surface 1c when the fuel is stored in the fuel tank 1, i.e., a direction perpendicular to the vertically upward and downward directions.

The assembling unit 2 includes a flange 3, a gasket 4, and a holder plate 7. The flange 3 is a disc-like lid made of plated iron or the like and closes an opening 1b formed in a ceiling part 1a of the fuel tank 1 from vertically above. The flange 3 may be made of a synthetic resin such as polyacetal instead of metal.

The gasket 4 is made of an elastomer in an annular shape. As illustrated to a larger scale in FIG. 2, the gasket 4 is interposed between the peripheral edge of the opening 1b of the fuel tank 1 and the flange 3 so as to provide a seal between the fuel tank 1 and the flange 3. Specifically, a washer 6 with screw holes is disposed on the outer periphery of the opening 1b of the fuel tank 1, and the gasket 4 and the flange 3 are sandwiched in the vertical direction between the washer 6 and screws 5 and fastened, to provide a seal. In the first embodiment, in particular, NBR (acrylonitrile butadiene rubber) having excellent oil resistance is employed as the elastomer. Mixture compositions such as a vulcanizing agent that induces crosslinking of rubber or a vulcanization accelerator that accelerates vulcanization and improves the physical properties of rubber are mixed in NBR during the production of the material.

The holder plate 7 is a bracket plate made of plated iron or the like in the form of a long plate extending along the vertical direction. The holder plate 7 is held by the flange 3 and extends vertically downward from the flange 3.

Figure 3:
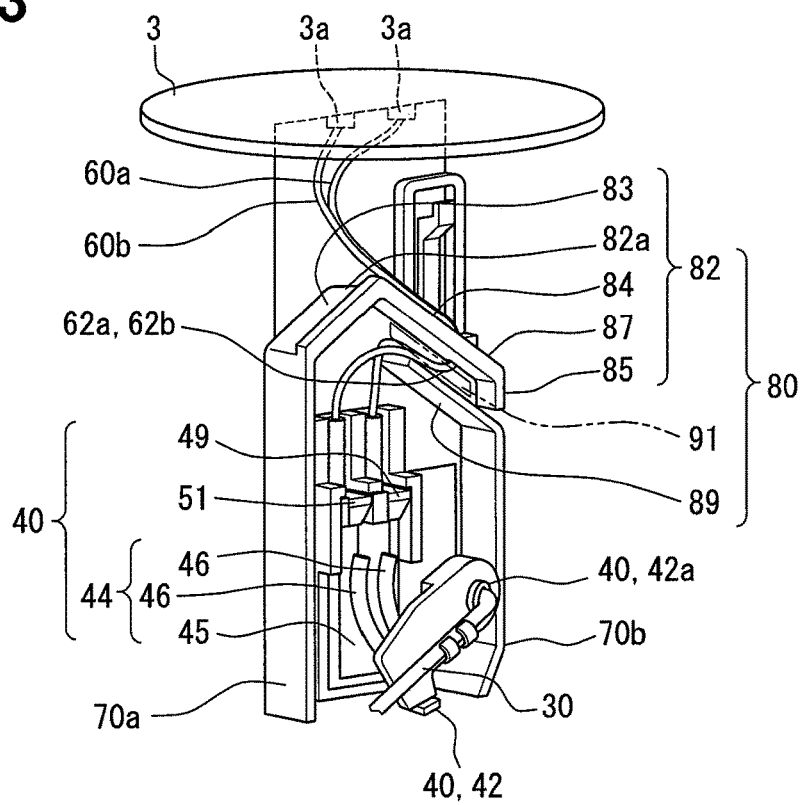
FIG. 3 is a perspective view illustrating part of the assembling unit and liquid surface sensing device in the first embodiment.
Figure 4:
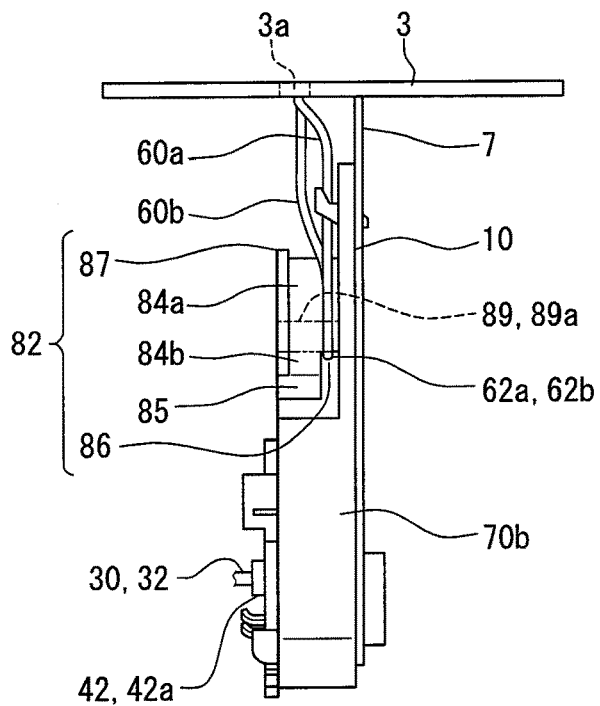
FIG. 4 is a side view illustrating part of the assembling unit and liquid surface sensing device in the first embodiment.

The liquid surface sensing device 100 is assembled to the flange 3 by being held on the holder plate 7 inside the fuel tank 1, as illustrated in FIG. 1, FIG. 3, and FIG. 4. The liquid surface sensing device 100 includes a holder wall 10, a float 20, a float arm 30, a sensing unit 40, two lead wires 60a and 60b, two side walls 70a and 70b, a guide 80, and so on.

Figure 5:
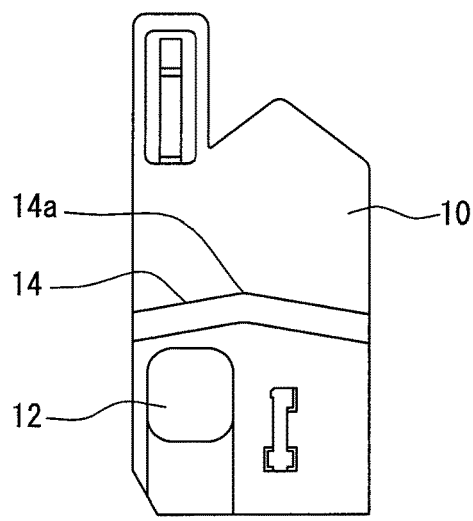
FIG. 5 is a rear view illustrating part of the liquid surface sensing device in the first embodiment.

The holder wall 10 is made of a synthetic resin such as a polyacetal resin or polyphenylene sulfide resin in the form of a plate that is shorter than the holder plate 7 in the vertical direction. The holder wall 10 is attached to the holder plate 7 by a snap-fit joint so that the holder wall 10 is located vertically below the flange 3 in surface contact with the holder plate 7. The holder wall 10 has a through hole 12 for a rotating shaft 32 of the float arm 30 to pass through. The holder wall 10 includes a discharge groove 14 in the surface that is in surface contact with the holder plate 7 vertically above the sensing unit 40, i.e., vertically above the through hole 12 as illustrated in FIG. 5. The discharge groove 14 has a peak 14a in the middle in the horizontal direction of the holder wall 10 and extends diagonally downward from the peak 14a to both edges in the horizontal direction of the holder wall 10. The holder wall 10 holds the sensing unit 40 on the opposite surface from the holder plate 7.

The float 20 is made of a material having a smaller specific weight than fuel such as foamed ebonite, so that the float 20 can float on the liquid surface 1c of the fuel, as illustrated in FIG. 1.

The float arm 30 is made from a round rod metal material such as stainless steel or the like. The float 20 is held on one end, or a first end, of both ends of the float arm 30. The rotating shaft 32 is formed on the second end of the float arm 30; the rotating shaft is held by an arm holder 42 of the sensing unit 40, and extends through the through hole 12 of the holder wall 10.

The sensing unit 40 is held on the holder plate 7 via the holder wall 10 so that it is disposed vertically below the flange 3 as illustrated in FIG. 1 and FIG. 3 so as to sense the liquid surface 1c of the liquid. The sensing unit 40 includes the arm holder 42, a variable resistor 44, a power supply terminal 49, and a ground terminal 51.

The arm holder 42 is made of a synthetic resin that has excellent oil resistance, solution resistance, and mechanical characteristics, such as a polyacetal resin or polyphenylene sulfide resin. The arm holder 42 has a boss 42a that fixes the rotating shaft 32 of the float arm 30, and is supported such as to be rotatable relative to the holder wall 10 and the variable resistor 44 by the boss 42a.

The variable resistor 44 is configured by a substrate 45 held by the holder wall 10, a pair of resistor patterns 46, and a sliding member 47 or the like held by the arm holder 42. The substrate 45 is held on the opposite surface from the holder plate 7 of the holder wall 10, and made of ceramics or the like in the form of a plate. The pair of resistor patterns 46 are formed on the surface of the substrate 45 opposite the arm holder 42. The resistor patterns 46 are resistive elements formed as a thick film in an arcuate form around the rotating shaft by printing and baking a mixture paste of silver, palladium, and glass frit on the substrate 45. One of the pair of resistor patterns 46 is electrically connected to the power supply terminal 49, while the other is electrically connected to the ground terminal 51.

Figure 6:
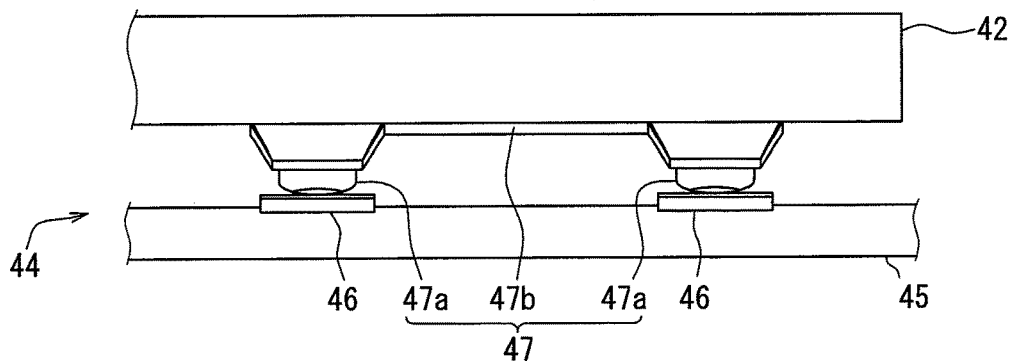
FIG. 6 is a cross-sectional view illustrating part of a sensing unit in the first embodiment.

The sliding member 47 is held on the surface of the arm holder 42 opposite the substrate 45 as illustrated in FIG. 6, and formed by a pair of sliding contacts 47a corresponding to the pair of resistor patterns 46, and a connector element 47b electrically connecting the pair of sliding contacts 47a. The connector element 47b is a strip of metal material such as a copper alloy or the like containing copper that has excellent conductivity, and is disposed such that the connector element 47b is secured to the arm holder 42. Each of the pair of sliding contacts 47a is disposed at an end of the connector element 47b. The tip of each sliding contact 47a is formed by joining a heat-melted metal material with a gold content of 95% or more, preferably 99% or more to the copper alloy of the connector element 47b. Each sliding contact 47a has a curved surface protruding toward the resistor pattern. As the arm holder 42 rotates, the sliding contacts 47a in contact with the corresponding resistor patterns 46 each slide on the resistor patterns 46. Then, the sliding member 47 establishes electrical connection between the pair of resistor patterns 46.

The power supply terminal 49 and the ground terminal 51 are each made of a conductive metal material in the form of a plate as illustrated in FIG. 1 and FIG. 3, and are arranged side by side in the horizontal direction vertically above the variable resistor 44. The power supply terminal 49 is electrically connected to one of the pair of resistor patterns 46, while the ground terminal 51 is electrically connected to the other one of the resistor patterns 46.

Then, the power supply terminal 49 and the ground terminal 51 in the sensing unit 40 are electrically conductive to each other via the resistor patterns 46 and the sliding member 47. As the float 20 moves up and down in accordance with the height of the liquid surface 1c, the sliding member 47 slides on the resistor patterns 46 as described above, so that an electrical resistance between the power supply terminal 49 and the ground terminal 51 changes. Thus the sensing unit 40 can sense the liquid surface 1c by measuring the electrical resistance.

The two lead wires 60a and 60b are formed by coating a conductive wire made of copper for example with an insulating material such as vinyl or the like as illustrated in FIG. 1, FIG. 3, and FIG. 4. The two lead wires 60a and 60b connect the sensing unit 40 with an external device via the flange 3. Specifically, of two ends of a first lead wire 60a of the two lead wires 60a and 60b, a first end is electrically connected to the power supply terminal 49. The second end extends through the through hole 3a of the flange 3 and is connected to the external device. In two ends of a second lead wire 60b, a first end is electrically connected to the ground terminal 51. The second end extends through the through hole 3a of the flange 3 and is connected to the external device, similarly to the first lead wire 60a.

The two side walls 70a and 70b are made of a synthetic resin such as a polyacetal resin or polyphenylene sulfide resin and each formed along the edges in the vertical direction on both sides in the horizontal direction of the sensing unit 40.

The side wall disposed on a first side in the horizontal direction of the sensing unit 40 is referred to as a left side wall 70a, while the side wall disposed on a second side in the horizontal direction of the sensing unit 40 is referred to as a right side wall 70b.

The guide 80 is made of a synthetic resin such as a polyacetal resin or polyphenylene sulfide resin and is disposed to overlap the sensing unit 40 vertically thereabove. The guide 80 includes a first protrusion 82 and a second protrusion 89 protruding from the holder wall 10 in the opposite direction from the holder plate 7, a flow passage formed on a top surface of the first protrusion 82, and a flow passage 91 formed between the first protrusion 82 and the second protrusion 89.

The first protrusion 82 is a plate in the form of a chevron protruding from the upper end of the holder wall 10 in the opposite direction from the holder plate 7 and covers the sensing unit 40 from vertically above. More particularly, the first protrusion 82 includes two ridges 83 and 84, a left ridge 83 extending from a peak 82a of the chevron diagonally down left, and a right ridge 84 extending from the peak 82a diagonally down right. The distal end of the left ridge 83 extending diagonally down left is connected continuously to the left side wall 70a. The right ridge 84 includes a connected part 84a connected to the holder wall 10 at the peak 82a, and a separated part 84b distanced from the holder wall 10 at the distal end extending diagonally down right. The first protrusion 82 further includes a side face portion 85 extending from the distal end of the separated part 84b vertically downward. The side face portion 85 is positioned vertically above the right side wall 70b and distanced from the holder wall 10 and from the right side wall 70b. These gaps form, on the first protrusion 82, a hook portion 86 for hooking the lead wires 60a and 60b between the connected part 84a and the separated part 84b.

The first protrusion 82 further includes a vertically upward extended wall 87 protruding vertically upward along an edge in the horizontal direction. The vertically upward extended wall 87 extends continuously from the left ridge 83 and the right ridge 84. In the schematic diagram of FIG. 1, the vertically upward extended wall 87 is not illustrated.

The second protrusion 89 is in the form of a plate protruding from the holder wall 10 in the opposite direction from the holder plate 7 vertically below the right ridge 84 across the passage 91. The second protrusion 89 extends from its base that is continuously connected to the right side wall 70b diagonally up left substantially parallel to the right ridge 84, and is connected to the holder wall 10 from the base to a distal end 89a. In other words, the second protrusion 89 is inclined such that the farther the second protrusion 89 is away from the sensing unit 40, the lower the second protrusion 89 is in the vertical direction. The distal end 89a of the second protrusion 89 is located diagonally up left relative to the hook portion 86 of the first protrusion 82.

Now, the relation between the lead wires 60a, 60b and the guide 80 will be explained in detail. The lead wires 60a and 60b extend diagonally down right from through holes 3a in the flange 3. The lead wires 60a and 60b are then inserted through the gap between the first protrusion 82 and the holder wall 10 and the right side wall 70b into the passage 91 between the first protrusion 82 and the second protrusion 89. Here, the lead wires 60a and 60b are hooked to the hook portion 86 of the first protrusion 82 and thereby bent. The lead wires 60a and 60b that are bent are then oriented diagonally up left in the passage 91, being guided by the second protrusion 89 from vertically below. The lead wires 60a and 60b thus oriented diagonally up left are further bent at the distal end 89a of the second protrusion 89 and come out of the passage 91, and extend vertically downward. The lead wires 60a and 60b thus oriented vertically downward are connected to the terminals 49 and 51, respectively.

The guide 80 routes the lead wires 60a and 60b extending from the flange 3 diagonally downward to form valley portions 62a and 62b so as to direct the lead wires diagonally upward. Since the valley portions 62a and 62b are formed near the hook portion 86, the valley portions 62a and 62b are offset in the horizontal direction from the sensing unit 40 vertically above the sensing unit.

After the production and delivery, the liquid surface sensing device 100 described above is started to be used after the fuel tank 1 is filled. After the production, mainly during the period before the filling, the gasket 4 may suffer bleeding which is an exuding phenomenon of liquid composition to the surface. Since the gasket 4 is in contact with the vertically lower side of the flange 3, the liquid composition transfers to the vertically lower side. The liquid composition further travels down the lead wires 60a and 60b that extend from the flange 3 diagonally downward. However, when the liquid composition reaches the valley portions 62a and 62b, the liquid composition stays at the valley portions 62a and 62b, because the lead wires on the flange 3 side and the lead wires on the sensing unit 40 side are both oriented diagonally upward with respect to the valley portions 62a and 62b. Even when the accumulated liquid composition drops onto the second protrusion 89 vertically therebelow, the liquid travels down to the right side wall 70b because of the inclination of the second protrusion 89, and reaches a point vertically lower than the sensing unit 40.

The advantageous effects of the above-described first embodiment will now be explained.

According to the first embodiment, when a liquid composition of the elastomer that is the gasket 4 sealing between the fuel tank 1 and the flange 3 exudes and travels down the lead wires 60a and 60b extending from the flange 3 diagonally downward, the guide 80, which bends the lead wires 60a and 60b and forms the valley portions 62a and 62b to direct the lead wires diagonally upward, causes the liquid composition to stay in the valley portions 62a and 62b and to hardly travel from the valley portions 62a and 62b toward the sensing unit 40. It prevents the liquid composition from adhering or bonding to metals used in the sensing unit 40, which may cause deterioration of the sensing unit 40 or adversely affect the sensing results.

According to the first embodiment, the valley portions 62a and 62b are offset in the horizontal direction from the sensing unit 40, so that the liquid composition that has accumulated in the valley portions 62a and 62b can hardly reach the sensing unit 40 even when it drops from the valley portions 62a and 62b.

According to the first embodiment, the first protrusion 82 covers the sensing unit 40 from vertically above. Accordingly, even when the liquid composition from the gasket 4 accumulates on the vertically lower side of the flange 3 and drops down instead of traveling down the lead wires 60a and 60b, the first protrusion 82 prevents the liquid from directly dropping onto the sensing unit 40, so that the possibility of the liquid composition adhering or bonding to metals in the sensing unit 40 and thereby causing deterioration of the sensing unit 40 or adversely affecting the sensing results can be reduced.

According to the first embodiment, the first protrusion 82 includes the vertically upward extended wall 87 protruding vertically upward along an edge in the horizontal direction at least vertically above the sensing unit 40. Accordingly, even when the liquid composition from the gasket 4 accumulates on the vertically lower side of the flange 3 and drops down instead of traveling down the lead wires 60a and 60b, the liquid composition that has dropped onto the first protrusion 82 is prevented from traveling along the edge in the horizontal direction of the first protrusion 82 and reaching the sensing unit 40.

According to the first embodiment, the second protrusion 89 guides the lead wires 60a and 60b from vertically below, so that the liquid composition is reliably prevented from traveling from the valley portions 62a and 62b toward the sensing unit 40.

According to the first embodiment, the second protrusion 89 is disposed vertically below the valley portions 62a and 62b and inclined such that the farther the second protrusion 89 is away from the sensing unit 40, the lower the second protrusion 89 is in the vertical direction. Therefore, even when the liquid composition that has accumulated in the valley portions 62a and 62b drops onto the second protrusion 89, the liquid composition can hardly reach the sensing unit 40.

According to the first embodiment, the holder wall 10 is provided with the discharge groove 14 which extends diagonally downward vertically above the sensing unit 40. With the above configuration, even when the liquid composition flows down along the holder wall 10, the liquid composition is accumulated in the discharge groove 14. Therefore, the possibility of the liquid composition reaching the sensing unit 40 is reduced.

According to the first embodiment, when the sensing unit 40 is of the type that senses the liquid surface 1c by measuring the electrical resistance, adhesion or bonding of a liquid component to metal in the sensing unit 40 may induce errors in the electrical resistance measurements and largely affect the sensing results. Since such adhesion or bonding is prevented in the present embodiment, a high synergistic effect can be achieved.

Second Embodiment

Figure 7:
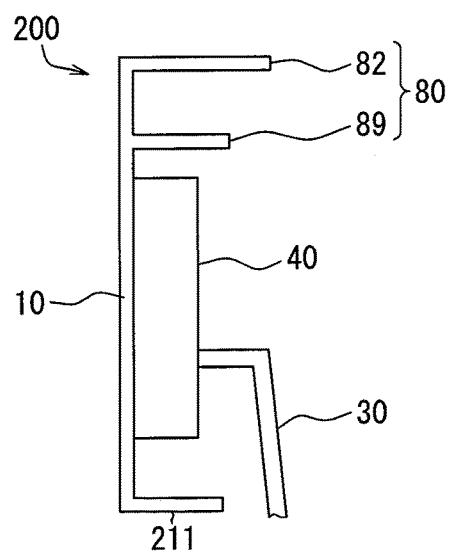
FIG. 7 is a schematic diagram illustrating part of a liquid surface sensing device in a second embodiment.

As illustrated in FIG. 7, the second embodiment of the present disclosure is a modification of the first embodiment. The second embodiment will now be described, mainly in respect of the points different from the first embodiment.

The holder wall 10 of a liquid surface sensing device 200 in the second embodiment has a laterally protruding wall 211 protruding in the horizontal direction vertically below the sensing unit 40. More particularly, the laterally protruding wall 211 is connected to the lower ends of the holder wall 10 and side walls 70a and 70b, and covers the sensing unit 40 from vertically below.

The shape of the guide 80 and the routing of the lead wires 60a and 60b are the same in the second embodiment, so that advantageous effects similar to those of the first embodiment can be achieved.

According to the second embodiment, the holder wall 10 includes the laterally protruding wall 211 protruding in the horizontal direction vertically below the sensing unit 40, so that the possibility of the liquid composition that has reached the lower end of the holder wall 10 rising by surface tension and reaching the sensing unit 40 is reduced.

Other Embodiments

While several embodiments of the present disclosure have been described above, the present disclosure should not be interpreted to be limited to these embodiments, and can be applied to various embodiments and combinations thereof without departing from the scope of the subject matter.

Figure 8:
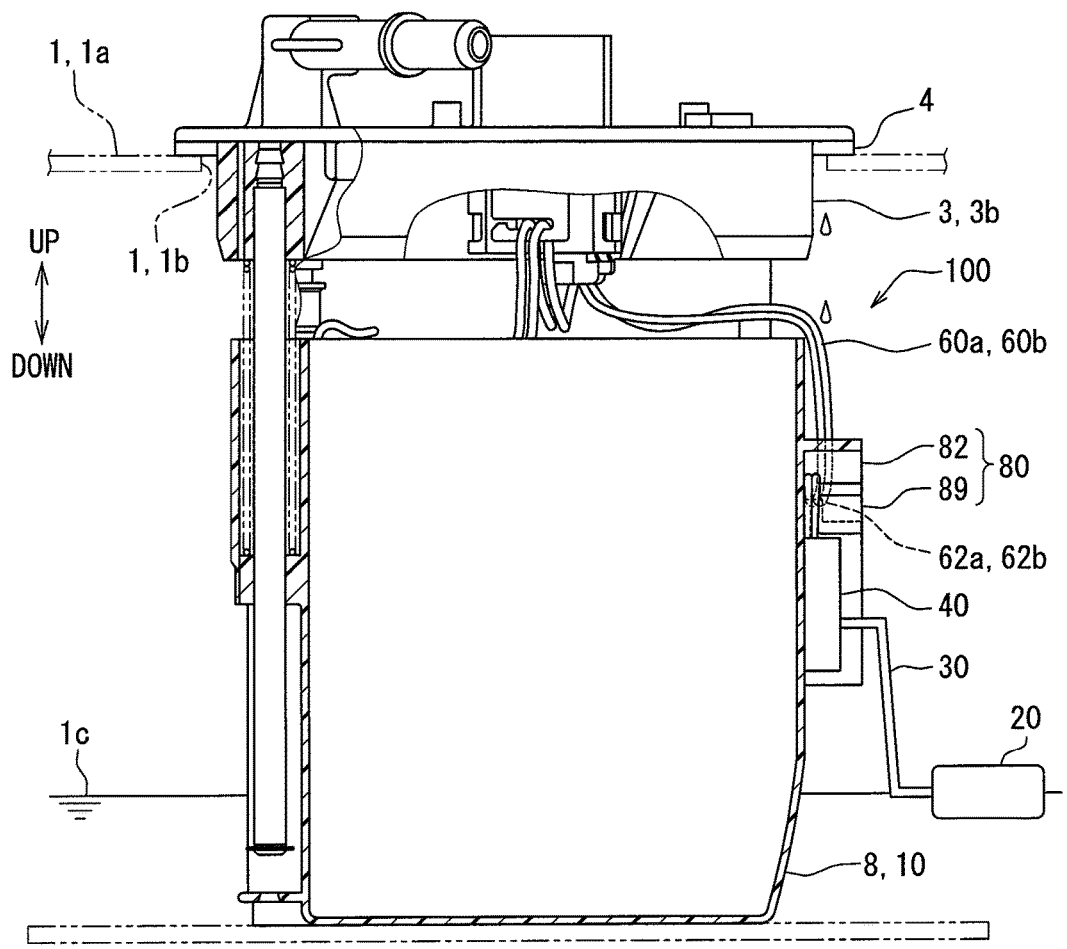
FIG. 8 is a schematic diagram illustrating an assembling unit and a liquid surface sensing device in a first modification and a second modification.

More specifically, as a first modification of the first and second embodiments, as illustrated in FIG. 8, a sub tank 8 and the holder wall 10 may be formed integral with each other. In FIG. 8, the internal structure of the sub tank 8 is not illustrated.

As a second modification of the first and second embodiments, as illustrated in FIG. 8, the flange 3 may have a vertically downward extended wall 3b protruding vertically downward from the vertically lower side of the flange. In the configuration illustrated in FIG. 8, while the lead wires 60a and 60b pass vertically below the gasket 4, the vertically downward extended wall 3b allows the liquid composition dropping from the gasket 4 directly onto the lead wires 60a and 60b to be accumulated in the valley portions 62a and 62b.

As a third modification of the first and second embodiments, the sensing unit 40 may be of the type that uses an electromagnetic conversion element electrically connected to the lead wires 60a and 60b via terminals and senses the liquid surface 1c by determining the direction of the magnet.

As a fourth modification of the first and second embodiments, the guide 80 may not include the first protrusion 82 and the second protrusion 89. The lead wires 60a and 60b can be guided also by grooves and/or holes.

As a fifth modification of the first and second embodiments, the valley portions 62a and 62b may be disposed vertically above the sensing unit 40.

As a sixth modification of the first and second embodiments, the present disclosure may reside in a liquid surface sensing device inside a container mounted on a vehicle containing other liquids, such as brake fluid, engine cooling water, engine oil and the like. Moreover, the present disclosure is applicable not only to vehicles but also to the liquid surface sensing device installed in a liquid container equipped in various consumer appliances and various transport equipment.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid surface sensing device installed in a container having an opening in a ceiling part, the opening closed by a flange with a gasket constituted by an elastomer providing a seal between the flange and a peripheral edge of the opening, the liquid surface sensing device being assembled to the flange and comprising:
   a sensing unit disposed vertically below the flange and sensing a liquid surface of a liquid inside the container;
   a lead wire connecting the sensing unit to an external device via the flange;

a guide bending the lead wire extending diagonally downward from the flange to form a valley portion to direct the lead wire diagonally upward; and a holder wall holding the sensing unit, wherein the guide protrudes from a surface of the holder wall, the guide and the surface of the holder wall define an opening at a diagonally upward side of the guide through which the lead wire passes, the surface of the holder wall is a planar surface, the guide includes:

a first protrusion that bends the lead wire extending diagonally downward from the flange, and a second protrusion that guides the lead wire from vertically below to direct the lead wire diagonally upward, wherein the first protrusion defines a first flow passage through which a liquid composition dropped from the flange without traveling down the lead wire flows, and the second protrusion defines a second flow passage through which a liquid composition traveling down the lead wire to be accumulated at the valley portion flows, and the holder wall has a discharge groove placed outside of the first flow passage and the second flow passage.

2. The liquid surface sensing device according to claim 1, wherein the valley portion is disposed horizontally offset from the sensing unit vertically above the sensing unit.

3. The liquid surface sensing device according to claim 1, wherein the first protrusion covering the sensing unit from vertically above.

4. The liquid surface sensing device according to claim 3, wherein the first protrusion includes a vertically upward extended wall protruding vertically upward along an edge in a horizontal direction at least vertically above the sensing unit.

5. The liquid surface sensing device according to claim 1, wherein the second protrusion is disposed vertically below the valley portion and inclined such that the second protrusion is far from the sensing unit as the second protrusion becomes lower in position in the vertical direction.

6. The liquid surface sensing device according to claim 1, wherein the holder wall discharge groove extends diagonally downward vertically above the sensing unit.

7. The liquid surface sensing device according to claim 6, wherein the holder wall has a laterally protruding wall protruding in the horizontal direction vertically below the sensing unit.

8. The liquid surface sensing device according to claim 1, wherein the holder wall has a laterally protruding wall protruding in the horizontal direction vertically below the sensing unit.

9. The liquid surface sensing device according to claim 1, wherein the sensing unit senses the liquid surface by measuring an electrical resistance.

10. The liquid surface sensing device according to claim 1, wherein the guide is continuous with and protrudes outward from the surface of the holder wall.

11. The liquid surface sensing device according to claim 1, wherein the first protrusion covering the sensing unit from vertically above, and including a left ridge extending from a peak diagonally downward left, a right ridge extending from the peak diagonally downward right and a vertically upward extended wall protruding vertically upward in a horizontal direction along an edge, the vertically upward extended wall extending continuously along an entire length of the left ridge and the right ridge, and the second protrusion extending diagonally upward left and disposed substantially parallel to the right ridge of the first protrusion.

12. A liquid surface sensing device installed in a container having an opening in a ceiling part, the opening closed by a flange with a gasket constituted by an elastomer providing a seal between the flange and a peripheral edge of the opening, the liquid surface sensing device being assembled to the flange and comprising:

a sensing unit disposed vertically below the flange and sensing a liquid surface of a liquid inside the container;

a lead wire connecting the sensing unit to an external device via the flange;

a guide bending the lead wire extending diagonally downward from the flange to form a valley portion to direct the lead wire diagonally upward; and a holder wall holding the sensing unit, wherein the guide protrudes from a surface of the holder wall, the guide and the surface of the holder wall define a hook portion at a diagonally downward side of the guide by which the lead wire is hooked, the surface of the holder wall is a planar surface, the guide includes:

a first protrusion that bends the lead wire extending diagonally downward from the flange, and a second protrusion that guides the lead wire from vertically below to direct the lead wire diagonally upward, wherein the first protrusion defines a first flow passage through which a liquid composition dropped from the flange without traveling down the lead wire flows, and the second protrusion defines a second flow passage through which a liquid composition traveling down the lead wire to be accumulated at the valley portion flows, and the holder wall has a discharge groove placed outside of the first flow passage and the second flow passage.

13. The liquid surface sensing device according to claim 12, wherein the guide is continuous with and protrudes outward from the surface of the holder wall.

14. The liquid surface sensing device according to claim 12, wherein the valley portion is adjacent to the hook portion.

15. The liquid surface sensing device according to claim 12, wherein the first protrusion covering the sensing unit from vertically above.

16. The liquid surface sensing device according to claim 15, wherein the first protrusion includes a vertically upward extended wall protruding vertically upward along an edge in a horizontal direction at least vertically above the sensing unit.

17. The liquid surface sensing device according to claim 12, wherein the second protrusion is disposed vertically below the valley portion and inclined such that the second protrusion is far from the sensing unit as the second protrusion becomes lower in position in the vertical direction.

18. The liquid surface sensing device according to claim 12, wherein the first protrusion covering the sensing unit from vertically above, and including a left ridge extending from a peak diagonally downward left, a right ridge extending from the peak diagonally downward right and a vertically upward extended wall protruding vertically upward in a horizontal direction along an edge, the vertically upward extended wall extending continuously along an entire length of the left ridge and the right ridge, and the second protrusion extending diagonally upward left and disposed substantially parallel to the right ridge of the first protrusion.

\* \* \* \* \*